E. F. RUSSELL.
Buckles.

No. 150,084.

Patented April 21, 1874.

WITNESSES.
J. P. Dickinson
Geo. Woodward

Eli F. Russell
INVENTOR.

UNITED STATES PATENT OFFICE.

ELI F. RUSSELL, OF PORTLAND, OREGON.

IMPROVEMENT IN BUCKLES.

Specification forming part of Letters Patent No. 150,084, dated April 21, 1874; application filed February 6, 1874.

*To all whom it may concern:*

Be it known that I, ELI F. RUSSELL, of the city of Portland, in the county of Multnomah and State of Oregon, have invented a new and valuable Improvement in Buckles; and I do hereby declare that the following is a full, clear, and exact description of the same in its construction and operation, reference being had to the annexed drawings, making part of this specification, and to the letters and figures of reference marked thereon.

Figure 1:
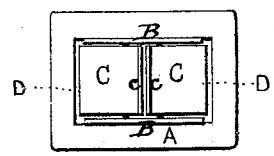
Figure 2:
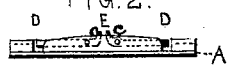
Figure 3:
Figure 4:
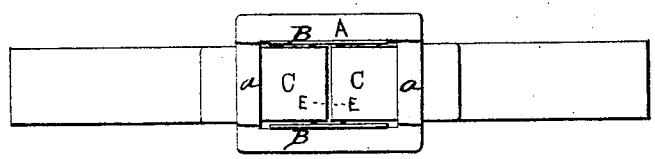

In the accompanying drawings, Figure 1 represents the plan of buckle. Fig. 2 represents side elevation of the same. Fig. 3 represents end elevation. Fig. 4 represents plan of same with belt or strap attached, and Fig. 5 represents side elevation of Fig. 4.

My invention relates to that class of buckles employing pivoted tongues or cams, caused to hold or clamp the strap by the tension of the latter; and it consists in a buckle having two pivoted levers or cams so arranged as to clamp the strap or belt between their shorter arms, and thereby hold it with great firmness, as I will now proceed to describe.

In the drawing, A represents the frame of the buckle, open in the center, and provided with two parallel lugs, B, one on each side, in which are pivoted the levers or cams C, each being so pivoted as to have a long and short arm. The short arm $c$ of each lever is adjacent to that of the other, and is provided with an upturned beveled edge, as shown. When the levers are in a position parallel with the frame, the short arms $c$ are in contact with each other, or nearly so, when the strap is not in place, as shown in Figs. 1 and 2.

Figure 5:
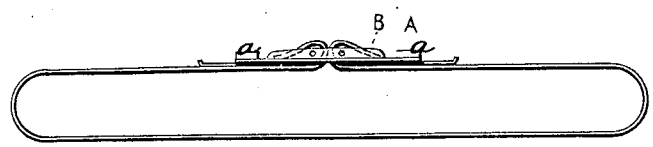

The strap is inserted by passing its ends upward through the center of the buckle, between the short arms $c$, and over each lever outwardly, as shown in Figs. 4 and 5, the ends being passed under raised portions $a$ on the ends of the frame A, said raised portions constituting loops. The strap being tightened, the short arms $c$ are drawn downward toward each other, griping or clamping the ends of the strap between them with great firmness. The beveled edges of the levers facilitate their hold on the strap, the firmness of the hold increasing in proportion to the strain applied.

The frame A, with its upturned lugs and raised end, is struck from one piece, the construction being cheap and simple.

What I claim is—

The frame A, having the lugs B and raised ends or loops $a$, in combination with the levers or cams C, having the adjacent short arms $c$, provided with upturned beveled edges, all arranged and operating substantially as shown and described.

In testimony that I claim the above I have hereunto subscribed my name in the presence of two witnesses.

ELI F. RUSSELL.

Witnesses:
J. P. DICKINSON,
GEO. WOODWARD.